US009883518B2

(12) United States Patent
Wigren

(10) Patent No.: US 9,883,518 B2
(45) Date of Patent: Jan. 30, 2018

(54) RADIO NETWORK NODE, A CONTROLLING RADIO NETWORK NODE, AND METHODS THEREIN FOR ENABLING MANAGEMENT OF RADIO RESOURCES IN A RADIO COMMUNICATIONS NETWORK

(71) Applicant: Telefonaktiebolaget LM Ericsson (publ), Stockholm (SE)

(72) Inventor: Torbjörn Wigren, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 50 days.

(21) Appl. No.: 15/176,720

(22) Filed: Jun. 8, 2016

(65) Prior Publication Data

US 2016/0316478 A1 Oct. 27, 2016

Related U.S. Application Data

(62) Division of application No. 14/345,995, filed as application No. PCT/SE2011/051139 on Sep. 23, 2011, now Pat. No. 9,386,590.

(51) Int. Cl.
*H04W 28/08* (2009.01)
*H04W 72/08* (2009.01)
(Continued)

(52) U.S. Cl.
CPC ........ *H04W 72/082* (2013.01); *H04B 17/345* (2015.01); *H04L 25/03101* (2013.01); (Continued)

(58) Field of Classification Search
CPC ...... H04W 72/082; H04W 24/10; H04L 25/03
(Continued)

(56) References Cited

U.S. PATENT DOCUMENTS 6,810,246 B1 * 10/2004 Kalofonos ............ H04W 16/18 370/241
7,565,152 B2 * 7/2009 Gandhi ................ H04W 28/12 455/452.1
(Continued)

FOREIGN PATENT DOCUMENTS

CN 101512940 A 8/2009
CN 101523775 A 9/2009
(Continued)

OTHER PUBLICATIONS

Unknown Author, "UL load measurement requirements for E-DCH", TSG-RAN Working Group 3 #44, R3-041356, Vodafone, Sophia-Antipolis, France, Oct. 4-8, 2004, 1-3.
(Continued)

*Primary Examiner* — Cong Tran
(74) *Attorney, Agent, or Firm* — Murphy, Bilak & Homiller, PLLC

(57) ABSTRACT

A radio network node serves a first cell in a radio communications network, and is configured to measure a received total power value at the radio network node in the first cell, compute a factor indicating a load in the first cell, estimate a noise floor level in the first cell, and compute a utilization probability value of the load in the first cell and a neighbor cell interference value simultaneously in a non-linear interference model. This is based on the measured received total power value, the computed factor, and the estimated noise floor level in the first cell. The neighbor cell interference value is an interference from at least one second cell affecting said first cell, and the utilization probability value of the load in the first cell and/or the neighbor cell interference value is to be used for managing radio resources in the radio communications network.

21 Claims, 7 Drawing Sheets

Start
401 Measure total power
402 Compute factor
403 Estimate noise floor
404 Compute utilization probability/neighbour cell interference
405 Schedule resources
406 Transmit utilization probability/neighbour cell interference
End 16
10
501 Measuring circuit
506 TX
502 1st Computing circuit
505 Scheduler
503 Estimating circuit
504 2nd Computing circuit
507 Processing circuit
508 Memory
12 Radio network node

(51) Int. Cl.

| | |
|---|---|
| ***H04W 72/12*** | (2009.01) |
| ***H04W 52/24*** | (2009.01) |
| ***H04W 72/04*** | (2009.01) |
| ***H04B 17/345*** | (2015.01) |
| ***H04L 25/03*** | (2006.01) |
| ***H04W 24/10*** | (2009.01) |

(52) U.S. Cl.

CPC .......... *H04W 24/10* (2013.01); *H04W 28/08* (2013.01); *H04W 52/243* (2013.01); *H04W 72/0486* (2013.01); *H04W 72/1252* (2013.01); *H04W 72/1231* (2013.01)

(58) Field of Classification Search

USPC ............ 455/452.1, 453, 561, 500, 501, 517

See application file for complete search history.

(56) References Cited

U.S. PATENT DOCUMENTS

| | | | |
|---|---|---|---|
| 7,912,461 | B2 | 3/2011 | Wigren |
| 8,630,672 | B2 | 1/2014 | Chami et al. |
| 9,179,363 | B2 | 11/2015 | Siomina et al. |
| 2009/0111481 | A1* | 4/2009 | Samuel ................ H04W 24/00 455/452.2 |
| 2011/0195731 | A1 | 8/2011 | Jang et al. |
| 2012/0008511 | A1 | 1/2012 | Fan et al. |
| 2012/0113843 | A1 | 5/2012 | Watfa et al. |
| 2012/0294162 | A1 | 11/2012 | Pajukoski et al. |
| 2013/0183994 | A1* | 7/2013 | Ringstrom .......... H04W 72/082 455/452.1 |
| 2013/0310060 | A1 | 11/2013 | Boudreau et al. |

FOREIGN PATENT DOCUMENTS

| | | | |
|---|---|---|---|
| CN | 101682429 | A | 3/2010 |
| WO | 2007024166 | A1 | 3/2007 |
| WO | 2007117188 | A1 | 10/2007 |
| WO | 2008156394 | A1 | 12/2008 |
| WO | 2009005420 | A1 | 1/2009 |
| WO | 2009038508 | A1 | 3/2009 |
| WO | 2009116905 | A1 | 9/2009 |

OTHER PUBLICATIONS

Wigren, Torbjörn et al., "Estimation of uplink WCDMA load in a single RBS", IEEE 66th Vehicular Technology Conference 2007, Sep. 30-Oct. 3, 2007, Baltimore, MD, USA. 1499-1503.

Wigren, Torbjörn, "Soft Uplink Load Estimation in WCDMA", IEEE Transactions on Vehicular Technology, Feb. 2009, pp. 760-772, vol. 58, No. 2.

Wigren, Torbjörn, "Recurvise Noise Floor Estimation in WCDMA", IEEE Transactions on Vehicular Technology, vol. 59, No. 5, Jun. 2010.

* cited by examiner

RADIO NETWORK NODE, A CONTROLLING RADIO NETWORK NODE, AND METHODS THEREIN FOR ENABLING MANAGEMENT OF RADIO RESOURCES IN A RADIO COMMUNICATIONS NETWORK

RELATED APPLICATIONS

This application is a division of co-pending U.S. patent application Ser. No. 14/345,995, filed 20 Mar. 2014, which is a national stage entry under 35 U.S.C. § 371 of international patent application serial no. PCT/SE2011/051139, filed 23 Sep. 2011. The entire contents of each of the aforementioned applications is incorporated herein by reference.

TECHNICAL FIELD

Embodiments herein relate to a radio network node, a controlling radio network node, and methods therein. In particular, embodiments herein relate to management of radio resources in a radio communications network.

BACKGROUND

In today's radio communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies. A radio communications network comprises radio base stations providing radio coverage over at least one respective geographical area forming a cell. User equipments (UE) are served in the cells by the respective radio base station and are communicating with respective radio base station. The user equipments transmit data over an air interface to the radio base stations in uplink (UL) transmissions and the radio base stations transmit he user equipments in downlink (DL) transmissions.

Recently two main trends have emerged in the cellular telephony business. First mobile broadband traffic is more or less exploding in the e.g. WCDMA networks. The technical consequence is a corresponding steep increase of the interference in these networks, or equivalently, a steep increase of the load. This makes it important to exploit the load headroom that is left in the most efficient way. Secondly, radio communications networks are becoming more heterogeneous, with macro radio base stations being supported by micro radio base stations at traffic hot spots. Furthermore, WCDMA home base stations, also called femto radio base stations, are emerging in many networks. This trend clearly puts increasing demands on inter-cell interference management.

Below it is described the measurement and estimation techniques, needed to measure the instantaneous total load, also referred to as the received total power value, on the uplink air interface. It is e.g. shown in prior art that the load at the antenna connector is given by the noise rise, or rise over thermal, RoT(t), defined by $$RoT(t) = \frac{P_{RTWP}(t)}{P_N(t)} \quad \text{(Eq. 1)}$$

where $P_N(t)$ is the thermal noise level as measured at the antenna connector, also referred to as noise floor level and where $P_{RTWP}(t)$ is the total power value. This relative measure is unaffected of any de-spreading applied. The definition used for the total power value used here is simply the received total power value called received total wideband power $$P_{RTWP}(t) = \sum_{k=1}^{K} P_k(t) + P_{neighbor}(t) + P_N(t) \quad \text{(Eq. 2)}$$

also measured at the antenna connector. Here $P_k(t)$ is the power from the load in the own cell and $P_{neighbor}(t)$ denotes the power as received from neighbor cells of the WCUMA system referred to herein as neighbor cell interference value. As be seen below, a major difficulty of any RoT estimation algorithm is to separate the noise floor level $P_N(t)$ from the neighbor cell interference value $P_{neighbor}(t)$.

Another specific problem that needs to be addressed is that the signal reference points are, by definition at the antenna connectors. The measurements are however obtained after the analogue signal conditioning chain, in the digital receiver. The analogue signal conditioning chain does introduce a scale factor error, $\gamma(t)$, of about 1 dB that is difficult to compensate for. Fortunately, all powers of (eq.2) are equally affected by the scale factor error $\gamma(t)$ so when (eq.1) is calculated, the scale factor error $\gamma(t)$ is cancelled as $$RoT^{Digital\ Receiver}(t) = \frac{P_{RTWP}^{Digital\ Receiver}(t)}{P_N^{Digital\ Receiver}(t)} = \frac{\gamma(t)P_{RTWP}^{Antenna}(t)}{\gamma(t)P_N^{Antenna}(t)} = RoT^{Antenna}(t) \quad \text{(Eq. 3)}$$

In order to understand the fundamental problem of the neighbor cell interference value when performing load estimation, note that $$P_{neighbor}(t)+P_N(t)=E[P_{neighbor}(t)]+E[P_N(t)]+\Delta P_{neighbor}(t)+\Delta P_N(t) \quad \text{(Eq. 4)}$$

where E[ ] denotes mathematical expectation and where $\Delta$ denotes the variation around the mean. Since there are no measurements available in the radio base station that are elated to the neighbor cell interference value, a linear filtering operation can at best estimate the sum $E[P_{neighbor}(t)]+E[P_N(t)]$. This estimate cannot be used to deduce the value of $E[P_N(t)]$. The situation is the same as when the such of two numbers is available. Then there is no way to figure out the values of the individual numbers.

In the 3rd Generation Partnership Project (3GPP) release 99, also called 3G systems, the Radio Network Controller (RNC) controls resources and user mobility. Resource control in this framework means admission control, congestion control, channel switching, and/or roughly changing the data rate of a connection. Furthermore, a dedicated connection is carried over a Dedicated Channel (DCH), which is realized as a Dedicated Physical Control Channel (DPCCH) and a Dedicated Physical Data Channel (DPDCII), In the evolved third generation (3G) standards, the trend is to decentralize making, and in particular the control over the short term data rate of the user connection. The uplink data is then allocated to an Enhanced-DCH (E-DCH), which is realized as the triplet: a DPCCH, which is continuous, an E-DCH (E)-DPCCH for data control and an E-DCH (E)-DPDCH for data. The two latter only transmitted when there is uplink data to send. Hence the uplink scheduler of the radio base station determines which transport formats each user can use over E-DPDCH. The RNC is however still responsible for admission control, the only way to control R99 traffic. Today the scheduling and admission control in the radio communications network are not performing in an optimal manner resulting in a reduced performance of the radio communications network. For scheduling in the radio base station, there is no available low complexity neighbor cell interference estimation technology. The available technology requires measurement and subsequent optimal filtering of all user equipment powers in the UL. That is very costly computationally, acid requires Kalman filters of high order for processing the measurements to obtain estimates of the neighbor cell interference value. The consequence is that the scheduler is unaware of the origin of the interference, thereby making it more difficult to arrive at good scheduling decisions. For managing heterogeneous networks (HetNets), which is a network composed of multiple radio access technologies, architectures, transmission solutions, and radio base stations of varying transmission power, the problem is again that there is no information of the origin of interference, and interference variance, for adjacent cells. This is also caused by the lack of low complexity estimators for these quantities.

SUMMARY

It is an object of embodiments herein to manage radio resources in an improved efficient manner enhancing the performance of the radio communications network.

According to an aspect the object is achieved by a method in a radio network node for enabling management of radio resources in a radio communications network. The radio network node serves a first cell. The radio network node measures a received total power value at the radio network node in the first cell. The radio network node computes a factor indicating a load in the first cell. The radio network node estimates a noise floor level in the first cell. The radio network node further computes a utilization probability value of the load in the first cell and a neighbor cell interference value simultaneously in a non-linear interference model, based on the measured received total power value, the computed factor, and the estimated noise floor level in the first cell. The neighbor cell interference value is an interference from at least one second cell affecting said first cell. At least one of the utilization probability value of the load in the first cell and the neighbor cell interference value is to be used for managing radio resources in the radio communications network.

According to another aspect the object is achieved by providing a radio network node for enabling management of radio resources in a radio communications network. The radio network node is configured to serve a first cell. The radio network node comprises a measuring circuit configured to measure a received total power value at the radio network node in the first cell. The radio network node further comprises a first computing circuit configured to compute a factor indicating a load in the first cell. In addition, the radio network node comprises an estimating circuit configured to estimate a noise floor level in the first cell. The radio network node further comprises a second computing circuit configured to compute a utilization probability value of the load in the first cell and a neighbor cell interference value simultaneously in a non-linear interference model. The computation is based on the measured received total power value, the computed factor, and the estimated noise floor level in the first cell. The neighbor cell interference value is an interference from at least one second cell affecting said first cell. At least one of the utilization probability value of the load in the first cell and the neighbor cell interference values to be used for managing radio resources in the radio communications network.

According to still another aspect the object is achieved by a method in a controlling radio network node for managing radio resources in a radio communications network. The controlling radio network node controls a second cell. The controlling radio network node receives, from a radio network node, at least one of a utilization probability value of a load in a first cell served by the radio network node and a neighbor cell interference value. The neighbor cell interference value is an interference from at least the second cell affecting the first cell. The neighbor cell interference value and the utilization probability value are based on a measured received total power value, a computed factor indicating the load in the first cell, and an estimated noise floor level in the first cell, computed in a non-linear interference model. The controlling radio network node uses at least one of the utilization probability value of the load in the first cell and the neighbor cell interference value, when managing radio resources within the radio communications network.

According to yet another aspect the object is achieved by providing a controlling radio network node for managing radio resources in a radio communications network. The controlling radio network node is configured to control a second cell. The controlling radio network node comprises a receiving circuit configured to receive, from a radio network node, at least one of a utilization probability value of a load in a first cell served by the radio network node and a neighbor cell interference value. The neighbor cell interference value is an interference from at least the second cell affecting the first cell. The neighbor cell interference value and the utilization probability value are based on a measured received total power value, a computed factor indicating the load in the first cell, and an estimated noise floor level in the first cell, computed in a non-linear interference model. The controlling radio network node further comprises a processing circuit configured to use at least one of the utilization probability value of the load if the first cell and the neighbor cell interference value, when managing radio resources within the radio communications network.

By using at least one of the utilization probability value of the load in the first cell and the neighbor cell interference value, according to embodiments herein, for managing radio resources in the radio communications network, the management of radio resources is based on more accurate values efficiently derived and the performance of the radio communications network is improved.

BRIEF DESCRIPTION OF THE DRAWINGS

Embodiments will now be described in more detail in relation to the enclosed drawings, in which.

DETAILED DESCRIPTION

Figure 1:
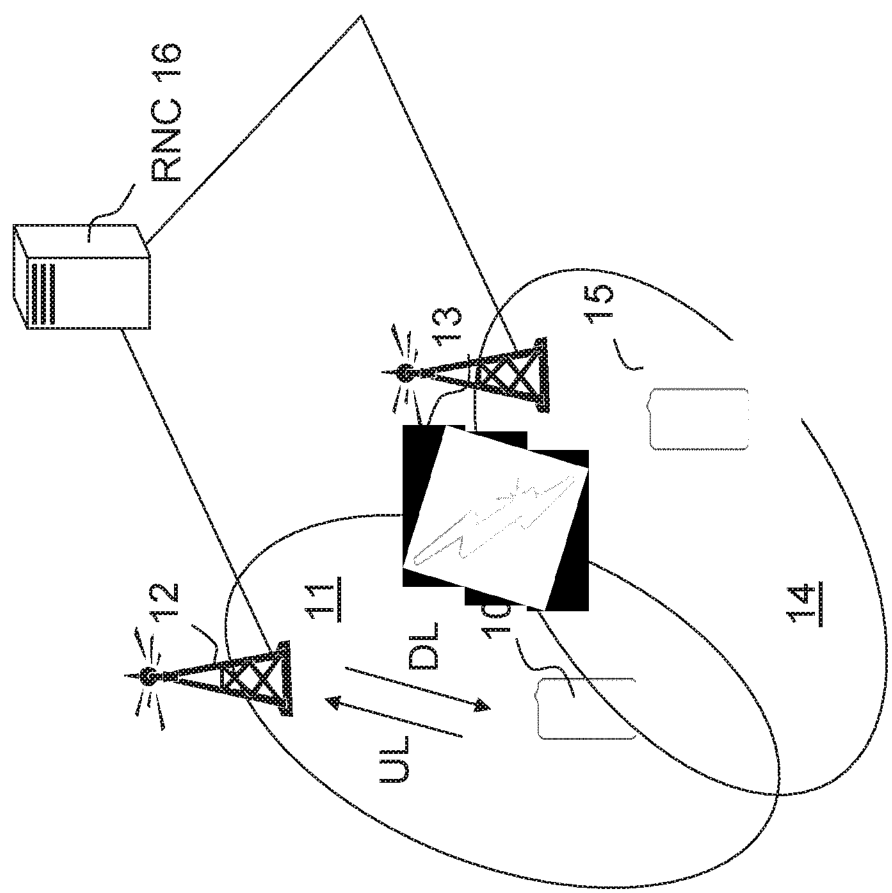
FIG. 1 is a schematic overview depicting embodiments of a radio communications network.

FIG. 1 is a schematic combined flowchart and signaling scheme in a radio communications network, such as a WCDMA network, or similar. The radio communications network comprises a radio network node, e.g. a first radio base station 12, providing radio coverage over at least one geographical area forming a cell, a first cell 11. The cell definition may also incorporate frequency bands used for transmissions, which means that two different cells may cover the same geographical area but using different frequency bands. A first user equipment 10 is served in the first cell 11 by the first radio base station 12 and may be communicating with the first radio base station 12. The first user equipment 10 transmits data over an air or radio interface to the first radio base station 12 in uplink (UL) transmissions and the first radio base station 12 transmits data over an air or radio interface to the first user equipment 10 in downlink (DL) transmissions. Furthermore, the radio communications network comprises a second radio base station 13 controlling a second cell 14 serving a second user equipment 15. The second user equipment 15 interferes with the first radio base station 12 causing a neighbor cell interference. The first radio base station 12 and the second radio base station 13 are controlled by a controlling radio network node, illustrated as a Radio Network Controller (RNC) 16. The first radio base station 12 manages radio resources in the first cell 11 e.g. by scheduling UL and DL transmissions in the first cell 11.

It should be understood that the term "user equipment" is a non-limiting term which means any wireless terminal, device or node e.g. Personal Digital Assistant (PDA), laptop, mobile, sensor, relay, mobile tablets, a Location Services (LCS) target device in general, an LCS client in the network or even a small base station.

The radio base stations, which are examples of radio network nodes, may also be referred to as e.g. a NodeB, an evolved Node B (eNB, eNode B), a base transceiver station, Access Point Base Station, base station router, or any other network unit capable to communicate with a user equipment 10 within the first cell 11 depending e.g. of the radio access technology and terminology used. Also, each radio base station 12,13 may further serve one or more cells. Other examples of radio network nodes serving the user equipments 10,15 are relay nodes or beacon nodes.

The radio communications network may be any cellular radio network comprising the controlling radio network node 16, capable of establishing and routing a data packet session through different network transmission paths exploiting different routing protocols, the radio communications network may e.g. be a Universal Mobile Telecommunications System (UMTS) Terrestrial Radio Access Network (TRAN) (UTRAN)-General Packet Radio Service (GPRS) network, a WCDMA network, a Code Division Multiple Access (CDMA) 2000 network, an Interim Standard (IS)-95 network, a Digital-Advance Mobile Phone Service (D-AMPS) network etc. The term RNC should here therefore not be interpreted to strictly so as to comprise only an RNC according to the 3GPP UTRAN standard, but any network control node capable of mapping a data session to different transmission paths through its different ports wherein the different transmission paths exploit different routing protocols. For instance, in case of a CDMA 2000 network, the RNC functionality described below according to embodiments herein may be realized in the Base Station Controllers (BSC) of the CDMA 2000 network.

An Enhanced UL (EUL) utilizes a scheduler in the first radio base station 12 that aims at filling a load headroom of the air interface, so that requests for bitrates of different user equipments are met. As stated above, the air-interface load in WCDMA is determined in terms of the RoT, a quantity that is measured in the first radio base station 12. When evaluating scheduling decisions, the scheduler has to predict a load that results from scheduled grants, to make sure that the scheduled load does not exceed the load thresholds for coverage and stability. This is complicated since a grant given to the first user equipment 10 does only express a limit on the UL power it is allowed to use, so the first user equipment 10 may in reality use only a portion of its grant. The scheduler in today's networks makes a worst case analysis, assuming that all user equipments use their grants at all times. Unfortunately, it has been found that user equipments do seem to have a relatively low utilization of grants. From measurements performed in the field the result indicates a typical grant utilization in certain scenarios of only about 25%. This is evidently an unacceptable waste of air-interface resources. To summarize, the lack of technology for estimation of a utilization probability value of the load in the first cell 11 and its valiance leads to underutilization of the air interface, due to the fact that user equipments often do not use the power granted to them. It also prevents the use of systematic statistical overbooking of grants, since a statistical model of load utilization is not available. In particular, no variance is available. The lack of technology for estimation of the utilization probability value and its variance also leads to a general inaccuracy of a load prediction, since un-modeled receiver impairments are not captured by an estimated utilization probability value.

Embodiments herein provide a non-linear interference model, e.g. for WCDMA UL, responsive to a measured received total power value, a factor indicating a load in the first cell 11, the utilization probability value of the load in the first cell 11, a neighbor cell interference value and a noise floor level, expressing an UL load curve relationship. At least one of the utilization probability value of the load in the first cell 11 and the neighbor cell interference value is to be used for managing radio resources in the radio communications network. The utilization probability value and the neighbor cell interference value are thus enabling the management of radio resources in the radio communications network. Some embodiments herein provide an estimator, responsive to measurements of the measured received total power value and said non-linear interference model. The estimator provides estimates of the utilization probability value and the neighbor cell interference value simultaneously computed in the non-linear interference model. The estimator may be characterized by its low order and associated low computational complexity. In a preferred embodiment the estimator is a variant of an Extended Kalman Filter (EKF), arranged for processing using said non-linear interference model.

Thus, embodiments herein provide estimates of utilization probability values and neighbor cell interference values simultaneously computed that may enhance the performance of the scheduler of the EUL and also the overall interference management performed in the RNC 16 for Heterogeneous Networks (HetNet). This may enhance the performance of the radio communications network. Furthermore, a network interference management may be simplified by providing neighbor cell interference values at central nodes in a Radio Access Network (RAN) and a Core Network (CN). Furthermore, embodiments herein may provide a Self-Organizing Network (SON) functionality in e.g. WCDMA networks. Such functionality is heavily dependent on knowledge of the interference situations in different cells.

Figure 2:
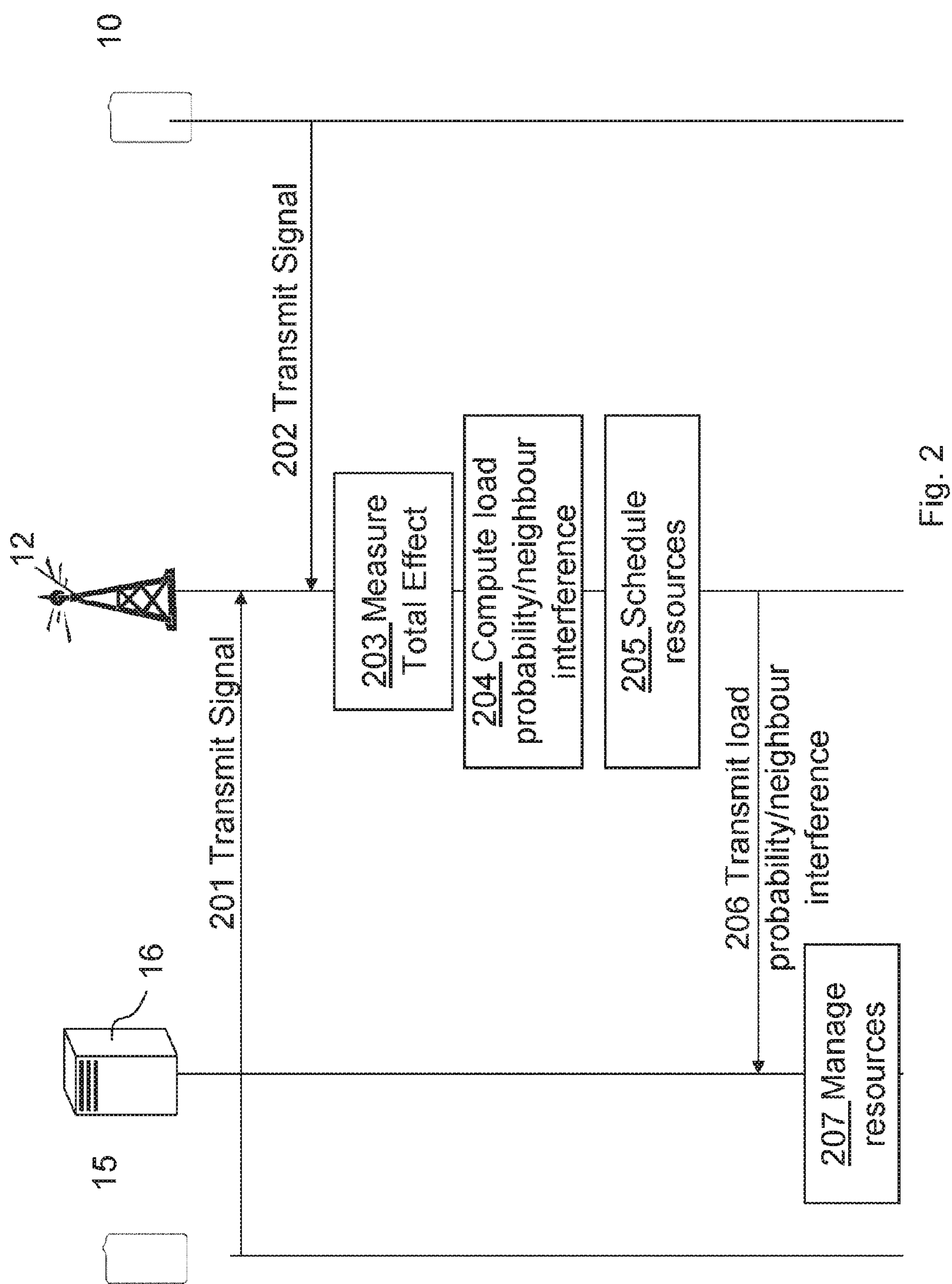
FIG. 2 is a schematic combined flowchart and signaling scheme depicting embodiments in the radio communications network.

FIG. 2 is a schematic combined flowchart and signaling scheme depicting embodiments herein.

Step 201. The second user equipment 15 in the second cell 14 transmits a signal that interferes with the first radio base station 12.

Step 202. The first user equipment 10 transmits a signal to the first radio base station 12.

Step 203. According to embodiments herein the first radio base station 12 measures the received total power value $P_{RTWP}$ at a receiver of the first radio base station 12, also referred to as a received total wide band power, including a noise generated in the receiver, within a bandwidth defined by a receiver pulse shaping filter. A reference point for the measurement may be a receiver (Rx) antenna connector of the first radio base station 12. In case of receiver diversity, the measured received total power value $P_{RTWP}$ may be a linear average of the power in the diversity branches. When cell portions are defined in the first cell 11, the received total power value $P_{RTWP}$ may be measured for each cell portion.

Furthermore, the first radio base station 12 computes the factor indicating a load in the first cell 11, $L_{own}$, and estimates the noise floor level, $P_N$, in the first cell 11.

Step 204. Additionally, the first radio base station 12 computes the utilization probability value $p_{load}$ of the load in the first cell 11 and the neighbor cell interference value $P_{neigbour}$ simultaneously in the non-linear interference model based on the measured received total power value $P_{RTWP}$, the computed factor $L_{own}$, and the estimated noise floor level $P_N$ in the first cell 11. The neighbor cell interference value $P_{neigbour}$ is an interference from at least one second cell 14 affecting said first cell 11. At least one of the utilization probability value $p_{load}$ of the load in the first cell 11 and the neighbor cell interference value $P_{neigbour}$ is to be used for managing radio resources in the radio communications network. Thus, the computed utilization probability value $p_{load}$ and the neighbor cell interference value enables managing of the radio resources either at the first radio base station 12 or at the RNC 16.

In some embodiments, any of the disclosed quantities in the current computed values, e.g. neighbor cell interference value $P_{neigbour}$, utilization probability value $p_{load}$, noise floor level $P_N$, etc., and the associated reporting may be requested: by the controlling radio network node such as the RNC 16; from a measuring node, e.g. the second radio base station 13, a home radio base station, a Location Management Unit (LMU) etc.; or from another network node e.g. a second RNC, a home radio base station gateway (GW), etc. by e.g. including a corresponding indicator in a request, e.g. in a Common Measurement Type message. The disclosed reporting may additionally or alternatively be periodic or event-triggered.

Step 205. The first radio base station 12 may schedule radio resources for the first user equipment 10 based on the neighbor cell interference value $P_{neigbour}$. E.g. the computed neighbor cell interference value $P_{neigbour}$ or the computed utilization probability value $p_{load}$ obtained after processing in the first radio base station 12 may be used for controlling or adjusting the maximum UL transmit powers of user equipments served by the first radio base station 12. The controlling may also be implemented dynamically and may also be used for power sharing in multi-Radio Access Technology (RAT) and multi-standard radio base stations.

Step 206. The first radio base station 12 may additionally or alternatively transmit the computed utilization probability value and/or the neighbor cell interference value $P_{neigbour}$ to the RNC 16. It should be noted that the noise floor level may also be transmitted to the RNC 16.

Step 207. The RNC 16 may use the computed utilization probability value $p_{load}$ and/or the neighbor cell interference value $P_{neigbour}$ when performing admission control to the first cell 11 and/or the second cell 14. Other examples are when the RNC 16 uses the computed utilization probability value $p_{load}$ and/or the neighbor cell interference value $P_{neigbour}$ when performing interference management in heterogeneous networks. Interference management in heterogeneous networks may comprise controlling interference in at least one of the first radio base station 12 and the second radio base station 13 by transmitting information such as orders or values to the different radio base stations 12, 13.

Figure 3:
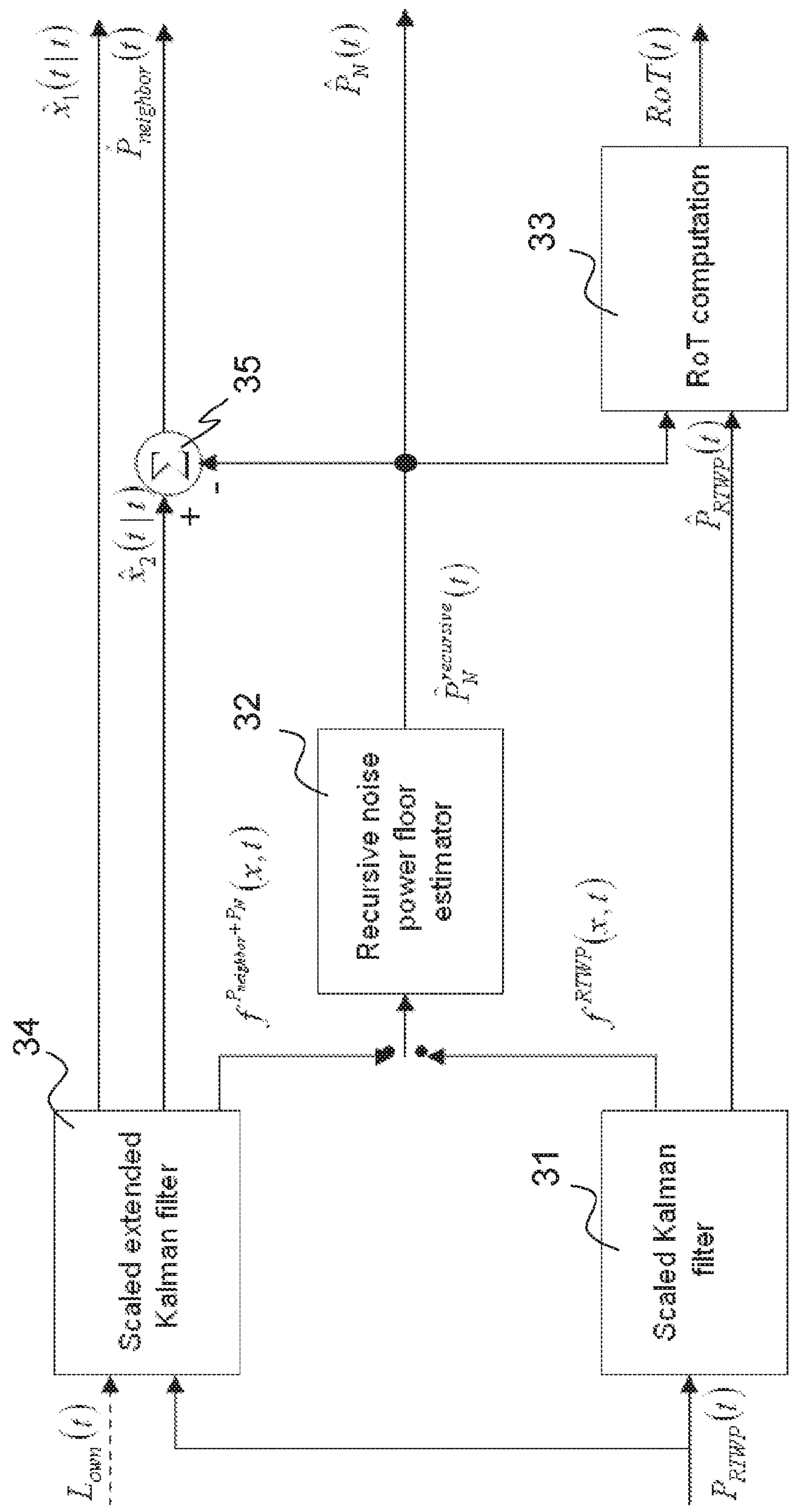
FIG. 3 is a block diagram depicting load estimation algorithms according to embodiments.

FIG. 3 is a block diagram depicting a load estimator structure. Switches and dashed arrows indicate optional functionality and inputs. The structure processes the received total power at a present time t denoted as $P_{RTWP}(t)$ the factor at time t denoted as $L_{own}(t)$ or average of a factor denoted as $\overline{L}_{own}(t)$, to produce an estimate of neighbor cell interference value at time t denoted as $\hat{P}_{neighbor}(t)$, an estimate of noise floor level at time t denoted as $\hat{P}_N(t)$, an estimate of a rise over thermal value at time t denoted RoT(t) and an estimate of the utilization probability value time t denoted as $\hat{x}_1(t|t)$. Obviously an estimate of a power in the first cell 11, denoted as $\hat{P}_{own}(t)$, and thus the load of the first cell 11 follows e.g. as $$\hat{P}_{own}(t)=\hat{P}_{RTWP}(t)-\hat{x}_2(t|t) \quad \text{(Eq. 5)}$$

where $\hat{P}_{RTWP}(t)$ defines an estimate of the received total power at time t, and $\hat{x}_2(t|t)$ defines an estimate of a sum of neighbor cell interference value and a noise floor level at time t.

The load estimator may comprise a scaled Kalman filter block 31, a recursive noise floor estimator 32, and a variant of RoT computations 33. This may be implemented in a Radio Unit (RU) of the first radio base station 12, for 10 ms TTIs by adding signaling of the factor $L_{own}(t)$ from the scheduler of the base band to the RU. A scaled extended Kalman filter 34 is comprised in the load estimator enabling signaling of the neighbor cell interference value and the utilization probability value from the RU to base band. The neighbor cell interference value and the utilization probability value are based on the factor $L_{own}(t)$ and the received total power value $P_{RTWP}(t)$. It should here be noted that an input $f^{P_{neighbor}+P_N}(x,t)$ to the recursive noise floor estimator 32 may be taken from the scaled extended Kalman Filter 34. This may result in better values as the minimum values are more accurate based on the sum of the sum of the neighbor cell interference value and the noise floor level, whereas an input $f^{RTWP}(x,t)$ from the scaled Kalman Filter block 31 is based on the received total power value. The sum of the neighbor cell interference value and the noise floor level is the reduced at a reduction process 35, with the estimate of the noise floor level $\hat{P}_N^{recursive}(t)$ being subtracted from the recursive noise floor estimator 32. The variant of RoT computations 33 uses an estimate $\hat{P}_{RTWP}(t)$ from the Scaled Kalman filter block 31 as input and the estimate of the noise floor level $\hat{P}_N^{recursive}(t)$. This results in a RoT value RoT(t), The estimate of the neighbor cell interference value $\hat{P}_{neighbour}(t)$, the estimate of the utilization probability value $\hat{x}_1(t|t)$, the estimated noise floor $\hat{P}_N(t)$, and the computed RoT(t) value may be used at the radio network node 12 and/or sent to the RNC 16.

Simulations wherein the basis for the data generation is a large set of UL power files generated in a high fidelity system simulator have been performed. The UL power files represent bursty traffic, with varying mix of speech and data traffic, at different load levels. These UL power files are then combined in different ways to generate UL power components, i.e. own cell traffic, neighbor cell traffic, noise floor level and the summed up receive total wide band power. The factor of the load in the first cell 11 is also computed. The user of the simulation may e.g. select the average power levels of the components, with respect to the noise floor level, select the number of neighbors used for neighbor cell interference, the utilization probability of the first cell 11, fix or varying between two limits; select the loop delay of the factor, related to grant loop delay; and/or set daily load patterns, and perturb these day-to-day by a randomization algorithm.

Here, the tuning of the scaled extended Kalman filter 34 is discussed in detail. The simulation files do represent the currently recommended setting for product development; the noise floor estimation bandwidth is e.g. set to the equivalent of about 20 h. The algorithmic constraints that affect the load utilization probability and neighbor cell interference estimation with the extended Kalman filter 34 is strongly related to the fact that only the total received power $P_{RTWP}(t)$ and the factor $L_{own}(t)$ are processed by extended Kalman filter 34.

To see the issue, consider a measurement equation $$c(\hat{x}(t\,|\,t-T_{TTI})) = \frac{\hat{x}_2(t\,|\,t-T_{TTI})}{1-L_{own}(t-T_D)\hat{x}_1(t\,|\,t-T_{TTI})} \quad \text{(Eq. 6)}$$

where $\hat{x}_2(t|t-T_{TTI})$ defines an estimate of a sum of neighbor cell interference value and a noise floor at a time between a present time t and sampling interval $T_{TTI}$, $\hat{x}_1(t|t-T_{TTI})$ defines an estimate of a utilization probability value at a time between present time t and sampling interval $T_{TTI}$, $L_{own}(t-T_D)$ is the factor of the load in the first cell 11 at the present time reduced with a time delay, and $c(\hat{x}(t|t-T_{TTI}))$ is a measurement vector which is a function of an estimate of a state vector $\hat{x}(t)$ describing signals of the radio communications network at a time between present time t and present time reduced with a sampling interval $T_{TTI}$; and equals the received total power value $P_{RTWP}(t)$ with error parameters taken into account.

The extended Kalman filter 34 provides estimates such that a model output from Eq. 6 follows the received total power at time t $P_{RTWP}(t)$. The estimator may adapt the estimate of the utilization probability value $\hat{x}_1(t|t)$ to the correct value, so that the load curve represented by eq.6, together with a correctly estimated sum of the neighbor cell interference value and noise floor level given by $\hat{x}_2(t|t)$, will achieve an output close to the received total power value $P_{RTWP}(t)$.

Unfortunately, Eq. 6 opens up for a shortcut to achieve this. Without a proper tuning the extended Kalman filter 34 may solve the problem of Eq. 6 by letting the estimate of the utilization probability value $\hat{x}_1(t|t)$ converge to 0, and the estimated sum of the neighbor cell interference value and noise floor level $\hat{x}_2(t|t)$ converge to the received total power value $P_{RTWP}(t)$. However, this solution represents a false solution to the estimation problem. The false solution occurs when the filter is turned with standard reasoning as follows. The natural way to tune would be to have a very low noise covariance—since the received total power value $P_{RTWP}(t)$ is very accurate, systems noise is then adapted to the desired time constants of the utilization probability value $\hat{x}_1(t|t)$ and the estimated sum of the neighbor cell interference value and noise floor level $\hat{x}_2(t|t)$, i.e. high levels giving high bandwidth. The extended Kalman filter 34 trusts the measurement more than the estimates. The result is then convergence to the false solution.

The remedy to this situation is to abandon the above tuning and go for a lower bandwidth. This then requires an artificial high noise covariance and reduced values of the systems noise. That tuning tells the filter to model the received total power value $P_{RTWP}(t)$ mostly by the estimates themselves, a fact that avoids the false solution as seen in the simulated results below. The current tuning sets the noise covariance very close to the noise power floor covariance level, with the system noise covariance for the neighbor cell interference more than 20 dBs below the noise floor level. The simulation results showed that the estimation of the load utilization probability value $\hat{x}_1(t|t)$ is not perfect. That is related to the low bandwidth tuning that forces this estimated state to work as an instrument to achieve the fit of the model to the received total power value $P_{RTWP}(t)$. The neighbor cell interference value was modeled so that the estimation error is about 5 dB below the actual neighbor cell interference value. That corresponds to an estimation inaccuracy of about 30%. This is deemed to be significantly better than prior art approaches, in particular since the model output is continuously aligned against the measured the received total power value $P_{RTWP}(t)$.

Figure 4:
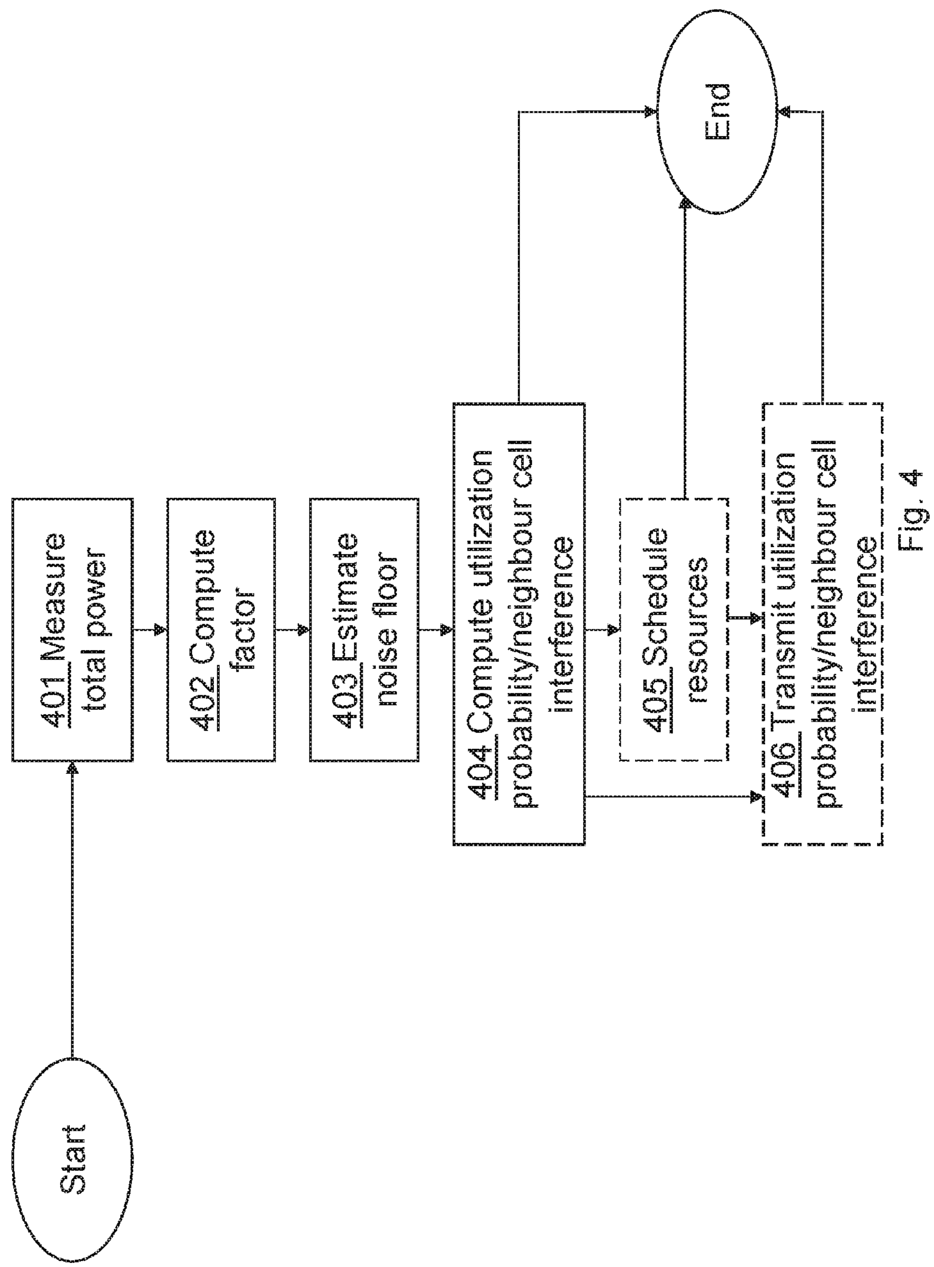
FIG. 4 is a schematic flowchart of a method in a radio network node according to embodiments herein.

FIG. 4 is a block diagram depicting a method in a radio network node, exemplified above as the first radio base station 12 and hereinafter referred to as the radio network node 12, for enabling management of radio resources in the radio communications network. The radio network node 12 serves the first cell 11.

Step 401. The radio network node 12 measures a received to al power value at the radio network node 12 in the uplink frequency band. This step corresponds to the step 204 in FIG. 2.

Step 402. The radio network node 12 computes a factor indicating a load in the first cell 11. The factor is also referred to as own cell load factor. Embodiments herein predict the instantaneous load on the uplink air interface ahead in time. This functionality may be needed by the scheduler of EUL. The reason is that the scheduler tests different combinations of grants to determine the best combinations, e.g. maximizing the throughput. This scheduling decision will only affect the air interface load after a number of transmission time intervals, each such TTI being 2 or 10 ms, due to grant transmission latency and UE latency before the new grant takes effect over the air interface. Time delay $T_D$ scheduling is further discussed below.

The factor may be based on the Signal to Interference Ratio (SIR) or any other similar ratio such as Signal to Interference plus Noise Ratio (SINR). The prediction of uplink load, for a tentative scheduled set of user equipments and grants, is based on the power relation $$P_{RTWP}(t) - P_N(t) = \sum_{i=1}^{N} L_i(t)P_{RTWP}(t) + P_{neighbor}(t), \quad \text{(Eq. 7)}$$

when $L_i(t)$ is the factor of the i:th user equipment of the own cell, e.g. the first cell 11, at the present time t and where $P_{neighbor}(t)$ denotes the neighbor cell interference value at the present time t. The factors of the load in the own cell are computed as follows. First it is noted that $$(C/I)_i(t) = \frac{P_i(t)}{P_{RTWP}(t) - (1-\alpha)P_i} = \frac{L_i(t)P_{RTWP}(t)}{P_{RTWP}(t) - (1-\alpha)L_i(t)P_{RTWP}(t)} = \frac{L_i(t)}{1-(1-\alpha)L_i(t)} \Leftrightarrow L_i(t) = \frac{(C/I)_i(t)}{1+(1-\alpha)(C/I)_i(t)}, \quad i = 1, \ldots, I, \qquad \text{(Eq. 8)}$$

where I is a number of user equipments in the own cell and $\alpha$ is a self-interference factor. $(C/I)_i(t)$ defines the carrier to interference ratio, e.g. roughly the signal-to-noise ratio at the chipping (3.84 MHz) speed.

The $(C/I)_i(t)$, i=1, . . . , I, are then related to a SINR measured on the Dedicated Physical Control Channel (DPCCH) as follows $$(C/I)_i(t) = \frac{SINR_i(t)}{W_i}\frac{RxLoss}{G} \times \left(1 + \frac{\beta_{DPDCH,i}^2(t) + \beta_{EDPCCH,i}^2(t) + n_{codes,i}(t)\beta_{EDPDCH,i}^2(t) + \beta_{HSDPCCH,i}^2(t)}{\beta_{DPCCH}^2(t)}\right), \quad i = 1, \ldots, I. \qquad \text{(Eq. 9)}$$

where $W_i$ is a spreading factor, RxLoss represents missed receiver energy, G is a diversity gain, and the $\beta$:s are beta factors of the respective channels, assuming not active channels to have zero beta factors.

The UL load prediction then computes the uplink load of the own cell by a calculation of (eq,8) and (eq,9) for each user equipment of the own cell, followed by a summation $$L_{own}(t) = \sum_{i=1}^{I} L_i(t) \qquad \text{(Eq. 10)}$$

which transforms Eq. 7 to $$P_{RTWP}(t) = L_{own}(t)P_{RTWP}(t) + P_{neighbor}(t) + P_N(t) \qquad \text{(Eq. 11)}$$

A division with the noise floor level $P_N(t)$ then shows that the RoT may be predicted k TTLs ahead, where k represents integers, as $$RoT(t+kT) = \frac{P_{neighbor}(t)/P_N(t)}{1-L_{own}(t)} + \frac{1}{1-L_{own}(t)}. \qquad \text{(Eq. 12).}$$

The SIR based load factor calculation may be replaced by a power based one, where the basic definition of the load factor $$L_i(t) = \frac{P_i(t)}{P_{RTWP}(t)}, \qquad \text{(Eq. 13)}$$

is used, instead of eq.8, where $P_i(t)$ defines the power of the user equipment i. The advantage is that the parameter dependence is reduced. On the downside a measurement of the user power is needed.

Step 403. The radio network node 12 estimates a noise floor level. The noise floor level may also be referred to as thermal noise. An example of a noise floor level estimation is a use of a so called sliding window noise floor level estimation algorithm.

It is e.g. shown in prior art that the load at the antenna connector is given by the noise rise, or rise over thermal, RoT(t) , defined, as stated above, by $$RoT(t) = \frac{P_{RTWP}(t)}{P_N(t)} \qquad \text{(Eq. 1)}$$

where $P_N(t)$ is the thermal noise or noise floor level as measured at the antenna connector. This relative measure is unaffected of any de-spreading applied. The algorithm estimates the RoT. A problem solved by this estimation algorithm is the accurate estimation of the noise floor level $P_N(t)$. Since it is not possible to obtain exact estimates of this quantity due to the neighbor cell interference value, the estimator therefore applies an approximation, by consideration of the soft minimum as computed over a relative long window in time.

It should be understood that this estimation relies on the fact that the noise floor level $P_N(t)$ is constant over very long periods of time, disregarding the small temperature drift. The sliding window noise floor level estimation algorithm has a disadvantage of requiring a large amount of storage memory. This becomes particularly troublesome in case a large number of instances of the algorithm is needed, as may be the case when interference cancellation is introduced in the uplink.

To reduce the memory consumption a recursive algorithm has been disclosed to estimate noise floor level $P_N(t)$. The recursive algorithms aggregate the information stored in the sliding window, into one single "state" that is updated from time instance to time instance. The recursive algorithm therefore reduces the memory requirements of the sliding window noise floor level estimation algorithm scheme discussed above at least by a factor of 100, or more precisely by a factor equal to the number of samples in the sliding window.

Thus, the estimation of the noise floor level may be based on the measured received total power value and the factor of the load in the first cell 11, a recursive algorithm, or a sliding window algorithm.

Step 404. The radio network node 12 computes a utilization probability value of the load in the first cell 11 and simultaneously computes a neighbor cell interference value in the first cell 11, which neighbor cell interference value is from at least one second cell 14. The computation of the utilization probability value and the neighbor cell interference value is based on the measured received total power value, the computed factor indicating the load in the first cell 11, and the estimated noise floor level.

Power measurements at the uplink receiver is associated with difficulties since the transmission of the WCDMA uplink is not orthogonal, a fact that causes errors when the powers are estimated. Furthermore, individual code powers are often small, making signal to noise ratios low as well. This fact contributes to the inaccuracy of said power estimates. The major problem associated with the solutions of today is however that the sum of neighbor cell interference value and noise floor level needs to be estimated by means of high order Kalman filtering. This step has a very high computational complexity. The computational complexity is in some examples increased as the number of user equipments increase.

Another problem with a baseline RoT algorithm is that the front-end Kalman filter processes data in the linear power domain. This means that it is tuned for best operation at a signal level around −100 dBm. Even in the past this has not always been the case, due to strong in-band interference e.g. from radar stations, and erroneous configuration and cell planning. The trend towards higher loads, more traffic, more user equipments together with HetNet network planning difficulties is bound to drive signal levels up in many networks. The conclusion is that there is a strong need for a signal power level independent estimation of the RoT. Techniques that achieve this with a low complexity have been developed. The power scaling applied by the new algorithm improves the tracking properties.

According to embodiments herein a new front end of the prior art RoT estimation algorithm is developed. The scope is to perform a joint estimation of the received total power value $P_{RTWP}(t)$, the sum of the neighbor cell interference value and the noise floor level $P_{neighbor}(t)+P_N(t)$, the noise floor level $P_N(t)$, the neighbor cell interference value $P_{neighbor}(t)$ and the load utilization probability value $p_{load}(t)$. As it turns out, Extended Kalman Filters (EKF) are suitable for this task. The EKFs also provide a signal tracking over a very wide dynamic range when provided with scaling.

In some examples an estimation algorithm uses the following information: measurements of the received total power value $P_{RTWP}(t)$, with a sampling rate $T_{RTWP}$ of $T_{RTWP}=k_{RTWP}TTI$, where integer k represents a set of positive integers i.e. $k_{RTWP} \in Z+$, and TTI represents Time Transmission Interval; computed factors $L_{own}(t)$, with a sampling rate $T_L$ of $T_L=k_L TTI$, $k_L \in Z+$; a delay $T_D$, also called loop delay, between the calculation of $L_{own}(t)$, and a time it takes effect on the air interface. The loop delay is dependent on the TTI.

The states are selected as $$x_1(t)=p_{load}(t) \quad \text{(Eq. 14)}$$

$$x_2(t)=P_{neighbor}(t)+P_N(t) \quad \text{(Eq. 15)}$$

The signal that is available for processing in this model is the received total power value $P_{RTWP}(t)$. The factor indication load of the own cell $L_{own}(t)$ is a computed quantity, e.g. based on SINR measurements, for this reason a measurement model of the received total power value $P_{RTWP}(t)$ is needed, expressed in terms of the states, computed quantities and a measurement uncertainty. Towards this end it is first noted that the load of eq8 does not account for the utilization probability value $p_{load}(t)$. Neither does it account for the delay $T_D$.

To model the utilization probability effect, a look at eq.5 suggests that load under-utilization may be modeled by a modification of eq.7 and eq.8 to $$L_{own,utilized}(t)=\sum_{i=1}^{I}P_{load}(t)L_i(t-T_D)=p_{load}(t)L_{own}(t-T_D), \quad \text{(Eq. 16)}$$

-continued $$P_{RTWP}(t)=L_{own,utilized}(t)P_{RTWP}(t)+P_{neighbor}(t)+P_N(t) \quad \text{(Eq. 17)}$$

which results in $$P_{RTWP}(t)=\frac{1}{1-L_{own}(t-T_D)p_{load}(t)}(P_{neighbor}(t)+P_N(t)). \quad \text{(Eq. 18)}$$

Thus, in some embodiments the computing of the utilization probability value of the load in the first cell 11 and the neighbor cell interference value is based on $$P_{RTWP}(t)=\frac{1}{1-L_{own}(t-T_D)p_{load}(t)}(P_{neighbor}(t)+P_N(t))$$

where t is a present time, $P_{RTWP}(t)$ is the received total power value, $T_D$ is a delay, $L_{own}(t-T_D)$ is the factor of the load in the first cell 11 at the present time reduced with the delay, $p_{load}(t)$ is the utilization probability value of the load in the first cell 11, $P_{neighbor}(t)$ is the neighbor cell interference value at the present time, $P_N(t)$, is the noise floor level, from which a sum of the neighbor cell interference value at the present $P_{neighbor}(t)$ and the noise floor level $P_N(t)$ is computed. Hence, the neighbor cell interference value at the present time $P_{neighbor}(t)$ and the noise floor level $P_N(t)$ is calculated/computed simultaneously.

After addition of a zero mean white measurement noise $e_{RTWP}(t)$ and replacement of variables by the states of eq.14 and eq.15, the following non-linear interference model is defined $$y_{RTWP}(t)=\frac{x_2(t)}{1-L_{own}(t-T_D)x_1(t)}+e_{RTWP}(t) \quad \text{(Eq. 19)}$$

$$R_{2,RTWP}(t)=E[e_{RTWP}^2(t)]. \quad \text{(Eq. 20)}$$

Here $y_{RTWP}(t)=P_{RTWP}(t)$ and $R_{2,RTWP}(t)$ denotes the (scalar) covariance matrix of $e_{RTWP}(t)$. Also note that the factor indicating load of the own cell is computed both using both EUL and R99 traffic, hence in this case the delay is valid for both.

In order to set up an optimal filtering algorithm, it is necessary to write down a model for propagation of the states, a so called dynamic state model. Since the two involved quantities are both positive quantities, it follows that any dynamic model needs to have integrating modes corresponding states, in order to allow dynamic variations around a nonzero positive mean value. Herein disclosed embodiments solve this by postulating the simplest such model, namely a random walk model.

The random walk model corresponding to the states of eq.14 and eq.15 becomes $$x(t+T_{TTI})\equiv\begin{pmatrix}x_1(t+T_{TTI})\\x_2(t+T_{TTI})\end{pmatrix}=\begin{pmatrix}1&0\\0&1\end{pmatrix}\begin{pmatrix}x_1(t)\\x_2(t)\end{pmatrix}+\begin{pmatrix}w_1(t)\\w_2(t)\end{pmatrix} \quad \text{(Eq. 21)}$$

-continued $$R_1(t) = E\left[\begin{pmatrix} w_1(t) \\ w_2(t) \end{pmatrix}\begin{pmatrix} w_1(t) & w_2(t) \end{pmatrix}\right]. \quad \text{(Eq. 22)}$$

Here $R_1(t)$ denotes a covariance matrix of a zero mean white disturbance $(w_1(t)\ w_2(t))^T$.

A state space model behind the extended Kalman filter (EKF) is $$x(t+T)=A(t)x(t)+B(t)u(t)+w(t) \quad \text{(Eq. 23).}$$

$$y(t)=c(x(t))+e(t) \quad \text{(Eq. 24).}$$

Here x(t) is a state vector, u(t) is an input vector that is not used here, y(t) is an output measurement vector consisting of the power measurements performed in the cell i.e. the total received wideband power, w(t) is the so called systems noise that represent the model error, and e(t) denotes a measurement error. Matrix A(t) is a system matrix describing the dynamic modes, a matrix B(t) is the input gain matrix, while the vector c(x(t)) is the, possibly non-linear, measurement vector which is a function of the states of the system. Finally, t represents a present time and T represents the sampling period.

Hence, in some embodiments the non-linear interference model uses error parameters and the non-linear interference model comprises at least a state space model wherein $$x(t+T)=A(t)x(t)+w(t)$$

$$y_{RTWP}(t)=c(x(t))+e(t),$$

where t represents the present time,

T represents a sampling period,

A(t) is a matrix describing dynamic modes, x(t) is a state vector defined as $$\begin{pmatrix} x_1(t) \\ x_2(t) \end{pmatrix}$$

where $$x_1(t)=p_{load}(t) \text{ and } x_2(t)=P_{neighbor}(t)+P_N(t),$$

w(t) is an error parameter defining systems noise, e(t) is an error parameter defining white measurement noise, $y_{RTWP}(t)$ is the received total power value $P_{RTWP}(t)$ plus the error parameter e(t), and c(x(t)) is a measurement vector which is a function of the state vector x(t) describing signals of the radio communications network and equals the received total power value $P_{RTWP}(t)$.

In some embodiments the matrix describing dynamic modes A(t) may be selected as an identity matrix of order 2. The error parameter defining the systems noise (w(t)) may be selected to enable convergence of the utilization probability value to non-false estimates by selecting the error parameter defining systems noise (w(t)) below a threshold value. In some embodiments the received total power value at the radio network node 12 and the computed factor of the load in the first cell 11 are used as input in a scaled extended Kalman filter 34. The scaled extended Kalman filter 34 may output a sum of the neighbor cell interference value and the noise floor level. The neighbor cell interference value may be computed by reducing the sum of the neighbor cell interference value and the noise floor level with the estimated noise floor level.

The general case with a non-linear measurement measurement vector is considered here. For this reason, the extended Kalman filter 34 needs to be applied. This extended Kalman filter 34 may be given by the following matrix and vector iterations.

Initialization $$t = t_0 \quad \text{(Eq. 25)}$$

$$\hat{x}(0\,|\,-1) = x_0$$

$$P(0\,|\,-1) = P_0$$

Iteration $$t = t + T$$

$$C(t) = \left.\frac{\partial c(x)}{\partial x}\right|_{x=\hat{x}(t|t-T)}$$

$$K_f(t) = P(t\,|\,t-T)C^T(t)(C(t)P(t\,|\,t-T)C^T(t) + R_2(t))^{-1}$$

$$\hat{x}(t\,|\,t) = \hat{x}(t\,|\,t-T) + K_f(t)(y(t) - c(\hat{x}(t\,|\,t-T)))$$

$$P(t\,|\,t) = P(t\,|\,t-T) - K_f(t)C(t)P(t\,|\,t-T)$$

$$\hat{x}(t+T\,|\,t) = A\hat{x}(t\,|\,t) + Bu(t)$$

$$P(t+T\,|\,t) = AP(t\,|\,t)A^T + R_1.$$

End

The quantities introduced by the filter iterations Eq. 25 are as follows, $\hat{x}$(t|t-31 T) denotes a state prediction, based on data up to time t−T, $\hat{x}$(t|t) denotes a filter update, based on data up to time t, P(t|t−T) denotes a covariance matrix of the state prediction, based on data up to time t−T, and P(t|t) denotes a covariance matrix of the filter update, based on data up to time t. C(t) denotes a linearized measurement matrix linearization around a most current state prediction, $K_f(t)$ denotes a time variable Kalman gain matrix, $R_2(t)$ denotes a measurement covariance matrix, and $R_1(t)$ denotes a system noise covariance matrix. It should be noted that $R_1(t)$ and $R_2(t)$ are often used as tuning variables of the extended Kalman filter 34. In principle the bandwidth of the filter is controlled by a matrix quotient of $R_1(t)$ and $R_2(t)$.

Quantities of the extended Kalman Filter 34 for estimation of utilization probability is below defined. An initial value setting is discussed in the simulation section above in FIG. 3.

Using eq.19-eq.22 and eq.25 it follows that $$C(t) = \left(\frac{L_{own}(t-T_D)\hat{x}_2(t\,|\,t-T_{TTI})}{(1-L_{own}(t-T_D)\hat{x}_1(t\,|\,t-T_{TTI}))^2} \quad \frac{1}{1-L_{own}(t-T_D)\hat{x}_1(t\,|\,t-T_{TTI})}\right) = (C_1(t) \quad C_2(t)) \quad \text{(Eq. 26)}$$

$$R_2(t) = R_{2,RTWP}(t) = E[e^2_{RTWP}(t)] \quad \text{(Eq. 27)}$$

$$c(\hat{x}(t\,|\,t-T_{TTI})) = \frac{\hat{x}_2(t\,|\,t-T_{TTI})}{1-L_{own}(t-T_D)\hat{x}_1(t\,|\,t-T_{TTI})} \quad \text{(Eq. 28)}$$

$$A = \begin{pmatrix} 1 & 0 \\ 0 & 1 \end{pmatrix} \quad \text{(Eq. 29)}$$

$$B = 0 \quad \text{(Eq. 30)}$$

-continued $$R_1(t) = E\left[\begin{pmatrix} w_1(t) \\ w_2(t) \end{pmatrix}(w_1(t) \quad w_2(t))\right]. \quad \text{(Eq. 31)}$$

In order to write down the Extended Kalman Filter 34, denote the state prediction and the state covariance prediction at time t by $$\hat{x}(t \mid t - T_{TTI}) = \begin{pmatrix} \hat{x}_1(t \mid t - T_{TTI}) \\ \hat{x}_2(t \mid t - T_{TTI}) \end{pmatrix} \quad \text{(Eq. 32)}$$

$$P(t \mid t - T_{TTI}) = \begin{pmatrix} P_{11}(t - T_{TTI}) & P_{12}(t - T_{TTI}) \\ P_{12}(t - T_{TTI}) & P_{22}(t - T_{TTI}) \end{pmatrix}. \quad \text{(Eq. 33)}$$

With these definitions the scalar equations of the extended Kalman filter iteration become, cf. Eq. 25,
Iteration $$t = t + T \quad \text{(Eq. 34)}$$

$$c(\hat{x}(t \mid t - T_{TTI})) = \frac{\hat{x}_2(t \mid t - T_{TTI})}{1 - L_{own}(t - T_D)\hat{x}_1(t \mid t - T_{TTI})}$$

$$C_1(t) = \frac{L_{own}(t - T_D)\hat{x}_2(t \mid t - T_{TTI})}{(1 - L_{own}(t - T_D)\hat{x}_1(t \mid t - T_{TTI}))^2}$$

$$C_2(t) = \frac{1}{1 - L_{own}(t - T_D)\hat{x}_1(t \mid t - T_{TTI})}$$

$$K_{f,1}(t) \frac{C_1(t)P_{11}(t \mid t - T_{TTI}) + C_2(t)P_{12}(t \mid t - T_{TTI})}{C_1^2(t)P_{11}(t \mid t - T_{TTI}) + 2C_1(t)C_2(t)P_{12}(t \mid t - T_{TTI}) + C_2^2(t)P_{22}(t \mid t - T_{TTI})}$$

$$K_{f,2}(t) \frac{C_1(t)P_{12}(t \mid t - T_{TTI}) + C_2(t)P_{22}(t \mid t - T_{TTI})}{C_1^2(t)P_{11}(t \mid t - T_{TTI}) + 2C_1(t)C_2(t)P_{12}(t \mid t - T_{TTI}) + C_2^2(t)P_{22}(t \mid t - T_{TTI})}$$

$$\hat{x}_1(t \mid t) = \hat{x}_1(t \mid t - T) + K_{f,1}(t)(y_{RTWP}(t) - c(\hat{x}(t \mid t - T)))$$

$$\hat{x}_2(t \mid t) = \hat{x}_2(t \mid t - T) + K_{f,2}(t)(y_{RTWP}(t) - c(\hat{x}(t \mid t - T)))$$

$$P_{11}(t \mid t) = P_{11}(t \mid t - T_{TTI}) - K_{f,1}(C_1(t)P_{11}(t \mid t - T_{TTI}) + C_2(t)P_{12}(t \mid t - T_{TTI}))$$

$$P_{12}(t \mid t) = P_{12}(t \mid t - T_{TTI}) - K_{f,1}(C_1(t)P_{12}(t \mid t - T_{TTI}) + C_2(t)P_{22}(t \mid t - T_{TTI}))$$

$$P_{22}(t \mid t) = P_{22}(t \mid t - T_{TTI}) - K_{f,2}(C_1(t)P_{12}(t \mid t - T_{TTI}) + C_2(t)P_{22}(t \mid t - T_{TTI}))$$

$$\hat{x}_1(t + T_{TTI} \mid t) = \hat{x}_1(t \mid t)$$

$$\hat{x}_2(t + T_{TTI} \mid t) = \hat{x}_2(t \mid t)$$

$$P_{11}(t + T_{TTI} \mid t) = P_{11}(t \mid t) + R_{1,11}(t)$$

$$P_{12}(t + T_{TTI} \mid t) = P_{12}(t \mid t) + R_{1,12}(t)$$

$$P_{22}(t + T_{TTI} \mid t) = P_{22}(t \mid t) + R_{1,22}(t)$$

End.

It is stressed that the estimated variance of the sum of neighbor cell interference and noise floor level is available in $P_{22}(t|t)$. Together with the estimate of a variance of the noise floor level, $\sigma_N^2(t|t)$ standard considerations show that a variance of the neighbor cell interference estimate $\sigma_{neighbor}^2(t|t)$ may be estimated as $$\sigma_{neighbor}^2(t|t) = \sigma_N^2(t|t) + P_{22}(t|t). \quad \text{(Eq. 35)}$$

A problem is due to the fact that the Kalman filter is designed at a specific operating point in the linear power domain. Now, with recent traffic increases, this is no longer true. Embodiments herein introduce a power normalization based on the following results assuming that the following assumptions A1)-A4) hold:

A1) Eigenvalues $\lambda$ of A fulfill $|\lambda| \leq 1$, i.e. A is stable.

A2) Non-linear load coupling between power control loops are neglected.

A3) e(t) is the measurement error and is a Gaussian zero mean disturbance that fulfills $E[e(t)e^T(s)] = \delta_{t,s}R_2(t)$, where s is a e instance and $\delta_{t,s}$ is the delta between t and s, A4) $w(t) = (w_1(t)\ w_2^{power}(t))^T$ is a Gaussian zero mean disturbance that fulfils $E[w(t)w^1(s)] = \delta_{t,s}R(t)$.

Assume further solutions $\hat{x}(t|t-T)$, $\hat{x}(t|t)$, $P(t|t-T)$, $P(t|t)$ are computed from eq.25 for $t > t_0$ using initial values $\hat{x}_0(t_0|t_0-T)$ and $P_0(t_0|t_0-T)$. Then, if eq.25 is rerun from $\hat{x}_0(t_0|t_0-T)$ and $P_0(t_0|t_0-T)$ using scaled covariance matrices $R_1(t) = v^2(t)R_1(t)$ and $R_2^v(t) = v^2(t)R_2(t)$, where v is a positive scale factor, the following results holds:

$$\hat{x}^v(t|t-T) = \hat{x}(t|t-T),\ t > t_0$$

$$\hat{x}^v(t|t) = \hat{x}(t|t),\ t > t_0$$

$$P^v(t|t-T) = v^2(t)P(t|t-T),\ t > t_0$$

$$P^v(t|t) = v^2(t)P(t|t),\ t > t_0$$

where the superscript $(\ )^v$ denotes a reiterated variable.

The achieved scaling of the covariances may be needed in order to make an estimated covariances scale with the average power level, thereby adapting to the logarithmic discretization of power in the noise floor level estimators.

It should be noted that simplified versions are also possible, where only a variance of a signal sent on for noise floor level estimation is scaled.

The result is valid when state covariance matrices are identically scaled. Hence, also the utilization probability value may be scaled using this technology in the present algorithms.

Step 405. The radio network node 12 schedules radio resources in the radio communications network, based on at least one of the utilization probability value and the neighbor cell interference value. For example, if the neighbor cell interference value is very high, there is no need to reduce the load in the own cell. Also, if the utilization probability value is very low in the first cell 11 the radio network node 12 may take that into account when scheduling radio resources to user equipments within the first cell 11.

The radio network node, e.g. the radio base station 12, may take UL data traffic into account when scheduling radio resources. A data block may be sent by the first user equipment 10 to the first radio base station 12 during a Transmission Time Interval (TTI). For efficiency reasons, the received data blocks at the receiver may be processed in parallel at M parallel processors taking turn to process data. While data block i is processed and decoding information is fed back to the transmitter, the receiver starts processing data blocks i, i+1, . . . . By the time when the receiver processor has decoded the data block and fed back the decoding result, it is ready for processing either a retransmission of information related to the recently processed data or a new data block. By combining information both from the original data block and the retransmission, it is possible to correct errors in the reception. A retransmission scheme with both error correction and error detection is referred to hybrid Automatic Request (HARQ). Therefore, M processors are often referred to as HARQ processes, each handling a data block received in a TTI. In the WCDMA uplink, there is a trade-off between coverage and enabled peak rates. This is even more emphasized with enhanced uplink, which supports higher bit rates than ordinary dedicated channels. The uplink resources are limited by the rise over thermal (RoT) that the cell can tolerate. The RoT limit is either motivated by coverage requirements or power control stability requirements. When only one user equipment is connected in the cell, both power control stability and coverage are minor issues, since the uplink interference is likely to be dominated by the power generated by this user equipment. In such a case it is tempting to allow a high RoT in order to allow high received signal relative interference powers, transmit energy per chip to the total transmit power spectral density Ec/Io, which enables the use of high uplink bit rates. Conversely, in order to use the high uplink bit rates, the connections to the first user equipment 10 may provide high Ec/Io, which implies high RoT.

In order to orthogonalize the uplink user transmissions to a greater extend, it may be relevant to separate the user data transmissions in time, and employ a Time Division Multiplexing (TDM) scheme. It is possible to allocate grants to a user equipment that is only valid for specified HARQ processes. This fact can be exploited to enable TDM for Enhanced (E−) UL. Furthermore, it allows retransmissions without interfering with other user equipments, since retransmissions hit the same HARQ process as the original transmission. The relevance for the load estimation functionality disclosed in embodiments herein is that there may be a need to repeat the disclosed functionality, for each TDM interval and HARQ process.

Step 406. The radio network node 12 may transmit at least one of the utilization probability value of the load in the first cell 11 and neighbor cell interference value to a controlling radio network node 16, e.g. an RNC. This may alternatively be transmitted to a second radio network node such as the second radio base station 13. Furthermore, the estimated noise floor level may also be transmitted to the controlling radio network node 16 or to the second radio network node 13. In some embodiments at least one of the utilization probability value of the load in the first cell 11 and the neighbor cell interference value is encoded in a field of a message transmitted to the controlling radio network node 16. The controlling radio network node 16 may use the utilization probability value, the neighbor cell interference or both, when e.g. performing admission control to the first cell 11.

Figure 5:
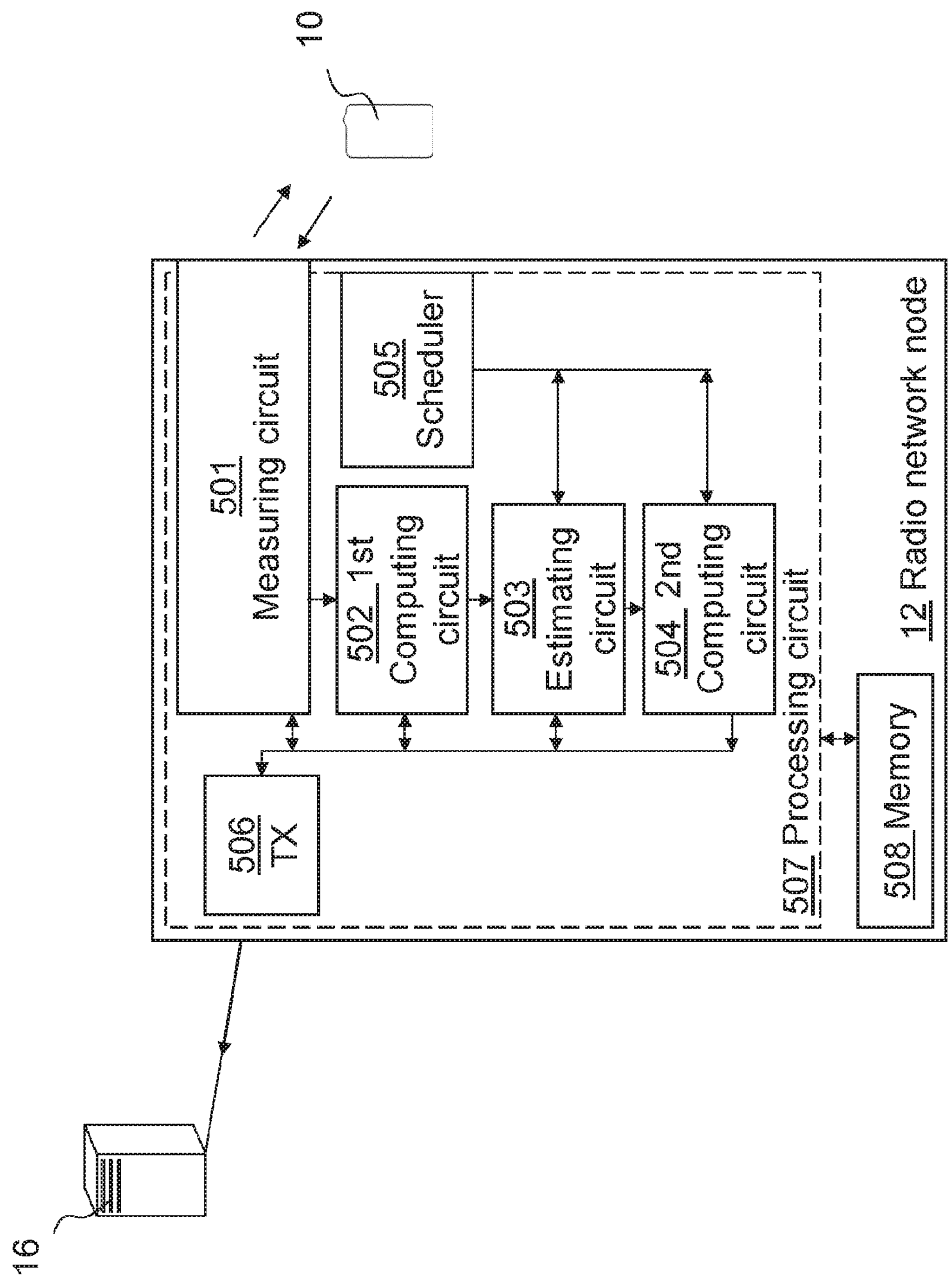
FIG. 5 is a block diagram depicting a radio network node according to embodiments herein.

FIG. 5 is a block diagram depicting the radio network node 12 for enabling management of radio resources in a radio communications network. The radio network node 12 is configured to serve the first cell 11.

The radio network node 12 comprises a measuring circuit 501 configured to measure a received total power value at the radio network node 12 in the first cell 11.

The radio network node 12 further comprises a first computing circuit 502 configured to compute a factor indicating a load in the first cell 11.

The radio network node 12 additionally comprises an estimating circuit 503 configured to estimate a noise floor level in the first cell 11. In some embodiments the estimating circuit 503 is configured estimate the noise floor level based on the measured received total power value and the factor of the load in the first cell 11, a recursive algorithm, or a sliding window algorithm.

Furthermore, the radio network node 12 comprises a second computing circuit 504 configured to compute a utilization probability value of the load in the first cell 11 and a neighbor cell interference value simultaneously in a non-linear interference model. The second computing circuit 504 is configured to base the computation on the measured received total power value, the computed factor, and the estimated noise floor level in the first cell 11. The neighbor cell interference value is an interference from at least one second cell 14 affecting said first cell 11, and where at least one of the utilization probability value of the load in the first cell 11 and the neighbor cell interference value is to be used for managing radio resources in the radio communications network. In some embodiments the second computing circuit 504 is configured to compute the utilization probability value of the load in the first cell 11 and the neighbor cell interference value based on $$P_{RTWP}(t) = \frac{1}{1 - L_{own}(t - T_D)p_{load}(t)}(P_{neighbor}(t) + P_N(t))$$

where t is a present time, $P_{RTWP}(t)$ is the received total power value,

TD is a delay.

$L_{own}(t=T_D)$ is the factor of the load in the first cell 11 at the present time reduced with the delay, $p_{load}(t)$ is the utilization probability value of the load in the first cell 11, $P_{neighbor}(t)$ is the neighbor cell interference value at the present time, $P_N(t)$ is the noise floor level, from which a sum of the neighbor cell interference value at the present time $P_{neighbor}(t)$ and the noise floor level $P_N(t)$ is computed.

The non-linear interference model may in some embodiments use error parameters and the non-linear interference model comprises at least a state space model wherein $$x(t+T)=A(t)x(t)+w(t)$$

$$y_{RTWP}(t)=c(x(t))+e(t),$$

where t represents the present time,

T represents a sampling period,

A(t) is a matrix describing dynamic modes, x(t) is a state vector defined as $$\begin{pmatrix} x_1(t) \\ x_2(t) \end{pmatrix}$$

where $$x_1(t)=p_{load}(t) \text{ and } x_2(t)=P_{neighbor}(t)+P_N(t),$$

w(t) is an error parameter defining systems noise, e(t) is an error parameter defining white measurement noise, $y_{RTWP}(t)$ is the received total power value $P_{RTWP}(t)$ plus the error parameter e(t), and c(x(t)) is a measurement vector which is a function of the state vector x(t) describing signals of the radio communications network and equals the received total power value $P_{RTWP}(t)$.

The second computing circuit 504 may in some embodiments be configured to select the matrix describing dynamic modes A(t) as an identity matrix of order 2.

Furthermore, the second computing circuit 504 may in some embodiments be configured to select the error parameter defining the systems noise (w(t)) to enable convergence of the utilization probability value to non-false estimates by selecting the error parameter defining systems noise (w(t)) below a threshold value.

In some embodiments the radio network node comprises a scheduler 505 configured to schedule radio resources in the first cell 11, based on at least one of the utilization probability value of the load in the first cell 11 and the neighbor cell interference value.

In some embodiments the radio network node 12 comprises a transmitting circuit 506 configured to transmit at least one of the utilization probability value of the load in the first cell 11, and the neighbor cell interference value to a controlling radio network node 16 or to a second radio network node 13. In some embodiments the transmitting circuit 506 may be further configured to encode at least one of the utilization probability value of the load in the first cell 11 and the neighbor cell interference value in a field of a message to be transmitted to the controlling radio network node 16.

In some embodiments a scaled extended Kalman filter 34 arranged in the radio network node 12 is configured to use the received total power value at the radio network node 12 and the computed factor of the load in the first cell 11 as input. The scaled extended Kalman filter 34 may be configured to output a sum of the neighbor cell interference value and the noise floor level. The second computing circuit 504 may be configured to compute the neighbor cell interference value by reducing the sum of the neighbor cell interference value and the noise floor level with the estimated noise floor level.

The radio network node 12 may be represented by a radio base station, a relay station, or a beacon station.

The embodiments herein for enabling management of radio resources may be implemented through one or more processors, such as a processing circuit 507 in the radio network node depicted in FIG. 5, together with computer program code for performing the functions and/or method steps of the embodiments herein. The program code mentioned above may also be provided as a computer program product, for instance in the form of a data carrier carrying computer program code for performing embodiments herein when being loaded into the radio network node 12. One such carrier may be in the form of a CD ROM disc. It is however feasible with other data carriers such as a memory stick. The computer program code may furthermore be provided as program code on a server and downloaded to the radio network node 12.

The radio network node 12 may further comprise a memory 508 that may comprise one or more memory units and may be used to store for example data such as utilization probability values, neighbor cell interference values, received total power values, factors indicating the load in the first cell 11, and estimated noise floor levels, scheduling parameters, applications to perform the methods herein when being executed on the radio network node 12 or similar.

Figure 6:
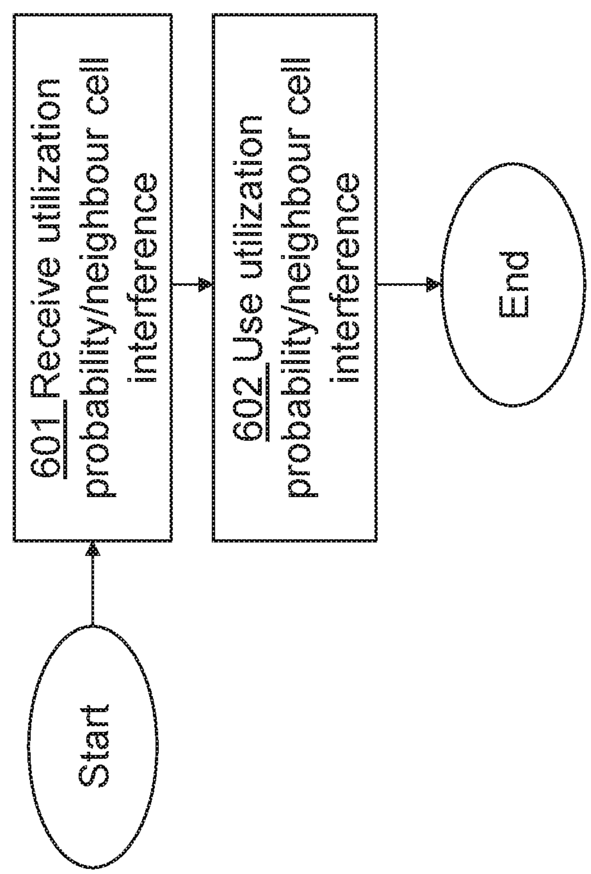
FIG. 6 is a schematic flowchart of a method in a controlling radio network node according to embodiments herein.

FIG. 6 is a schematic flowchart depicting embodiments herein of a method in the controlling radio network node, exemplified above as the RNC 16 and hereinafter referred to as the controlling radio network node 16, for managing radio resources in the radio communications network. The controlling radio network node 16 controls a second cell 14.

Step 601. The controlling radio network node 16 receives, from a radio network node 12, at least one of a utilization probability value of a load in a first cell 11 served by the radio network node 12 and a neighbor cell interference value. The neighbor cell interference value is an interference from at least the second cell 14 affecting the first cell 11. The neighbor cell interference value and the utilization probability value are based on a measured received total power value, a computed factor indicating the load in the first cell 11, and an estimated noise floor level in the first cell 11, computed in a non-linear interference model.

Step 602. The controlling radio network node 16 uses the at least one of the received utilization probability value of the load in the first cell 11 and the received neighbor cell interference value, when managing radio resources within the radio communications network. In some embodiments at least the neighbor cell interference value is used when performing admission control to the first cell 11 and/or the second cell 14 or when performing interference management in heterogeneous networks. For example, the performing interference management in heterogeneous networks may comprise to control at least one radio network node 12,13 e.g. by transmitting information or orders based on the neighbor cell interference value to the second radio network node 13.

Heterogeneous networks (HetNets) concerns effects associated with networks where different kinds of cells are mixed. A problem is then that these cells may have different radio properties in terms of e.g., radio sensitivity, frequency band, coverage, output power, capacity, and acceptable load level. This may be an effect of the use of different RBS sizes, e.g, macro, micro, pico, femto, different revision of different receiver technology or software quality, different vendors and of the purpose of a specific deployment.

One of the most important factor in HetNets is that of air interface load management, i.e. the issues associated with the scheduling of radio resources in different cells and the interaction between cells in terms of inter-cell interference. There is a need to optimize performance in HetNets.

To exemplify these problems, consider a low power cell with limited coverage intended to serve a hotspot. In order to get a sufficient coverage of the hot spot an interference suppressing receiver like the G-rake+ is used. The problem is now that the low power cell may be located in the interior of and at the boundary of a specific macro cell. Further, surrounding macro cells interfere with the low power cell rendering a high level of neighbor cell interference in the low powercell, that despite the advanced receiver reduces the coverage to levels that do not allow a coverage of the hot spot. As a result, user equipments of the hot spot are connected to the surrounding macro cells, thereby further increasing the neighbor cell interference experienced by the low power cell. Thus, it is advantageous when the controlling radio network node 16 or the surrounding RBSs is informed of the interference situation and take action, using e.g. admission control in the controlling radio network node 16 or a new functionality in the surrounding RBSs to reduce neighbor cell interference and to provide a better management of the hot spot traffic—in terms of air interface load. This is enabled in that the radio network node 12 estimates the neighbor cell interference in an accurate manner.

Figure 7:
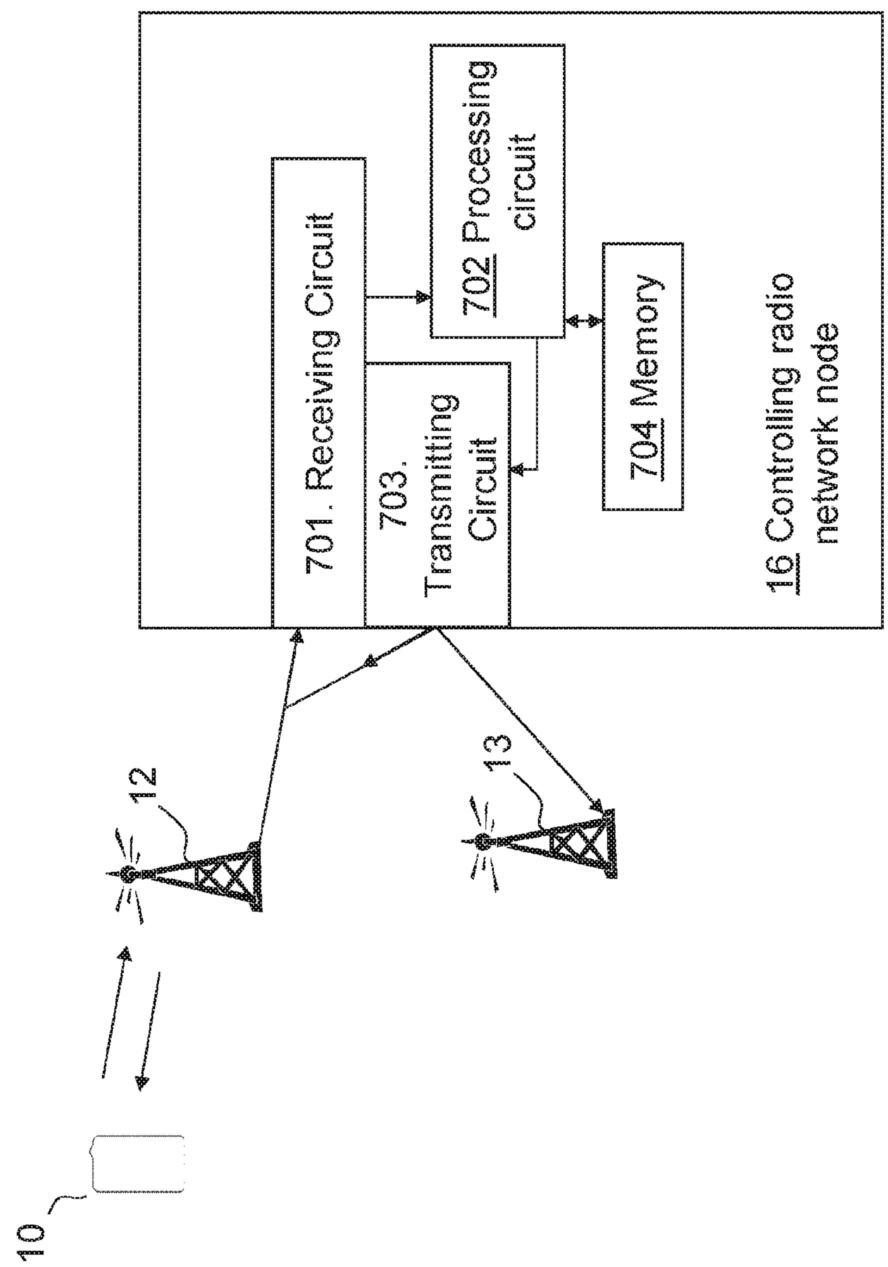
FIG. 7 is a block diagram depicting a controlling radio network node according to embodiments herein.

FIG. 7 is a block diagram depicting a controlling radio network node such as a radio network controller 16, for managing radio resources in a radio communications network. The controlling radio network node 16 is configured to control a second cell 14. The controller radio network node 16 comprises a receiving circuit 701 configured to receive, from a radio network node 12, at least one of a utilization probability value of a load in a first cell 11 served by the radio network node 12 and a neighbor cell interference value. The neighbor cell interference value is an interference from at least the second cell 14 affecting the first cell 11. The neighbor cell interference value and the utilization probability value are based on a measured received total power value, a computed factor indicating the load in the first cell 11, and an estimated noise floor level in the first cell 11, computed in a non-linear interference model.

The controlling radio network node 16 comprises a processing circuit 702 configured to use at least one of the utilization probability value of the load in the first cell 11 and the neighbor cell interference value, when managing radio resources within the radio communications network. The processing circuit 702 may in some embodiments be configured to use at least the neighbor cell interference value when performing admission control to the first cell 11 and/or the second cell 14; or when to perform interference management in heterogeneous networks. The processing circuit 702 may in some embodiments be configured to perform interference management in heterogeneous networks by controlling at least one radio network node 12,13 by transmitting information to the at least one radio network node 12,13. For example, the controlling radio network node 16 may comprise a transmitting circuit 703 configured to transmit information to a second radio network node 13 that takes action in response, e.g. modifying interference threshold values in the second cell 14, thereby the controlling radio network node 16 manages interference/radio resources in HetNets.

The embodiments herein for managing the radio resources may be implemented through one or more processors 702 in the controlling radio network node 16 depicted in FIG. 7, together with computer program code for performing the functions and/or method steps of the embodiments herein. The program code mentioned above may also be provided as a computer program product, for instance in the form of a data carrier carrying computer program code for performing embodiments herein when being loaded into the controlling radio network node 16. One such carrier may be in the form of a CD ROM disc. It is however feasible with other data carriers such as a memory stick. The computer program code may furthermore be provided as pure program code on a server and downloaded to the controlling radio network node 16.

The controlling radio network node may further comprise a memory 704 that may comprise one or more memory units and may be used to store for example data such as utilization probability values, neighbor cell interference values, received total power values, factors indicating the load in the first cell 11, parameters relating to other cells, estimated noise floor levels, scheduling parameters of different cells, load in different cells, interference parameters of different cells, applications to perform the methods herein being executed on the controlling radio network node or similar.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments herein being defined by the following claims.

What is claimed is:

1. A method in a radio network node or enabling management of radio resources in a radio communications network, which radio network node serves a first cell, the method comprising:

measuring a received total power value at the radio network node in the first cell;

computing a factor indicating a load in the first cell;

estimating a noise floor level in the first cell; and computing a utilization probability value of the load in the first cell and a neighbor cell interference value simultaneously in a non-linear interference model based on the measured received total power value, the computed factor, and the estimated noise floor level in the first cell, which neighbor cell interference value is an interference from at least one second cell affecting said first cell, and where at least one of the utilization probability value of the load in the first cell and the neighbor cell interference value is to be used for managing radio resources in the radio communications network.

2. The method according to claim 1, further comprising scheduling radio resources in the first cell, based on at least one of the utilization probability value of the load in the first cell and the neighbor cell interference value.

3. The method according to claim 1, further comprising transmitting at least one of the utilization probability value of the load in the first cell, and the neighbor cell interference value to a controlling radio network node or to a second radio network node.

4. The method according to claim 3, wherein at least one of the utilization probability value of the load in the first cell and the neighbor cell interference value is encoded in a field of a message transmitted to the controlling radio network node.

5. The method according to claim 1 wherein the computing of the utilization probability value of the load in the first cell and the neighbor cell interference value is based on $$P_{RTWP}(t) = \frac{1}{1 - L_{own}(t - T_D)p_{load}(t)}(P_{neighbor}(t) + P_N(t)),$$

where t is a present time, $P_{RTWP}(t)$ is the received total power value, $T_D$ is a delay, $L_{own}(t-T_D)$ is the factor indicating the load in the first cell at the present time reduced with the delay, $p_{load}(t)$ is the utilization probability value of the load in the first cell, $P_{neighbor}(t)$ is the neighbor cell interference value at the present time, $P_N(t)$ is the noise floor level, from which a sum of the neighbor cell interference value at the present time $P_{neighbor}(t)$ and the noise floor level $P_N(t)$ is computed.

6. The method according to claim 5, wherein the non-linear interference model further uses error parameters and the non-linear interference model comprises at least a state space model wherein $$x(t+T)=A(t)x(t)+w(t)$$

$$y_{RTWP}(t)=c(x(t))+e(t),$$

where t represents the present time, T represents a sampling period, A(t) is a matrix describing dynamic modes, x(t) is a state vector defined as $$\begin{pmatrix} x_1(t) \\ x_2(t) \end{pmatrix}$$

where $x_1(t)=p_{load}(t)$ and $x_2(t)=P_{neighbor}(t)+P_N(t)$ is an error parameter defining systems noise, e (t) is an error parameter defining white measurement noise, $y_{RTWP}(t)$ is the received total power value $P_{RTWP}(t)$ plus the error parameter e(t), and $c(x(t))$ is a measurement vector which is a function of the state vector $x(t)$ describing signals of radio communications network and equals the received total power value $P_{RTWP}(t)$.

7. The method according to claim 6, wherein the matrix describing dynamic modes $A(t)$ is selected as an identity matrix of order 2.

8. The method according to claim 6, wherein the error parameter defining the systems noise ($w(t)$) is selected to enable convergence of the utilization probability value to non-false estimates by selecting the error parameter defining systems noise ($w(t)$) below a threshold value.

9. The method according to claim 1, wherein the received total power value at the radio network node and the computed factor of the load in the first cell are used as input in a scaled extended Kalman filter and the scaled extended Kalman filter outputs a sum of the neighbor cell interference value and the noise floor level, and wherein the neighbor cell interference value is computed by reducing the sum of the neighbor cell interference value and the noise floor level with the estimated noise floor level.

10. The method according to claim 1, wherein the estimating of the noise floor level is based on the measured received total power value and the factor of the load in the first cell, a recursive algorithm, or a sliding window algorithm.

11. A radio network node for enabling management of radio resources in a radio communications network, wherein the radio network node is configured to serve a first cell and comprises:

a measuring circuit configured to measure a received total power value at the radio network node in the first cell;

a first computing circuit configured to compute a factor indicating a load in the first cell;

an estimating circuit configured to estimate a noise floor level in the first cell; and a second computing circuit configured to compute a utilization probability value of the load in the first cell and a neighbor cell interference value simultaneously in a non-linear interference model based on the measured received total power value, the computed factor, and the estimated noise floor level in the first cell, which neighbor cell interference value is an interference from at least one second cell affecting said first cell, and where at least one of the utilization probability value of the load in the first cell and the neighbor cell interference value is to be used for managing radio resources in the radio communications network.

12. The radio network node according to claim 11, further comprising a scheduler configured to schedule radio resources in the first cell, based on at least one of the utilization probability value of the load in the first cell and the neighbor cell interference value.

13. The radio network node according to claim 11, further comprising a transmitting circuit configured to transmit at least one of the utilization probability value of the load in the first cell, and the neighbor cell interference value to a controlling radio network node or to a second radio network node.

14. The radio network node according to claim 13, wherein the transmitting circuit is further configured to encode a least one of the utilization probability value of the load in the first cell and the neighbor cell interference value in a field of a message to be transmitted to the controlling radio network node.

15. The radio network node according to claim 11, wherein the second computing circuit is configured to compute the utilization probability value of the load in the first cell and the neighbor cell interference value based on $$P_{RTWP}(t) = \frac{1}{1 - L_{own}(t - T_D)p_{load}(t)}(P_{neighbor}(t) + P_N(t)),$$

where t is a present time, $P_{RTWP}(t)$ is the received total power value, TD is a delay, $L_{own}(t-T_D)$ is the factor of the load in the first cell at the present time reduced with the delay, $p_{load}(t)$ is the utilization probability value of the load in the first cell, $P_{neighbor}(t)$ is the neighbor cell interference value at the preset e. $P_N(t)$ is the noise floor level, from which a sum of the neighbor cell interference value at the present time $P_{neighbor}(t)$ and the noise floor level $P_N(t)$ is computed.

16. The radio network node according to claim 15, wherein the non-linear interference model uses error parameters and the non-linear interference model comprises at least a state space model wherein $$x(t+T)=A(t)x(t)+w(t)$$

$$y_{RTWP}(t)=c(x(t))+e(t),$$

where t represents the present time, T represents a sampling period, $A(t)$ is a matrix describing dynamic modes, $x(t)$ is a state vector defined as $$\begin{pmatrix} x_1(t) \\ x_2(t) \end{pmatrix}$$

where $x_1(t)=p_{load}(t)$ and $x_2(t)=P_{neighbor}(t)+P_N(t)$, $w(t)$ is an error parameter defining systems noise, $e(t)$ is an error parameter defining white measurement noise, $y_{RTWP}(t)$ is the received total power value $P_{RTWP}(t)$ plus the error parameter $e(t)$, and $c(x(t))$ is a measurement vector which is a function of the state vector $x(t)$ describing signals of the radio communications network and equals the received total power value $P_{RTWP}(t)$.

17. The radio network node according to claim 16, wherein second computing circuit is configured to select the matrix describing dynamic modes $A(t)$ as an identity matrix of order 2.

18. The radio network node according to claim 15, wherein second computing circuit is configured to select the error parameter defining the systems noise ($w(t)$) to enable convergence of the utilization probability value to non-false estimates by selecting the error parameter defining systems noise ($w(t)$) below a threshold value.

19. The radio network node according to claim 11, wherein a scaled extended Kalman filter is configured to use the received total power value at the radio network node and the computed factor of the load in the first cell as input and the scaled extended Kalman filter is configured to output a sum of the neighbor cell interference value and the noise floor level, and wherein the second computing circuit is configured to compute the neighbor cell interference value by reducing the sum of the neighbor cell interference value and the noise floor level with the estimated noise floor level.

20. The radio network node according to claim 11, wherein the estimating circuit is configured estimate the noise floor level based on the measured received total power value and the factor of the load in the first cell, a recursive algorithm, or a sliding window algorithm.

21. The radio network node according to claim 11, wherein the radio network node is a radio base station, a relay station, or a beacon station.

* * * * *